Sept. 28, 1954 C. A. FINERAN 2,690,201
SELF-LOCKING NUT
Filed Dec. 20, 1949 2 Sheets-Sheet 1
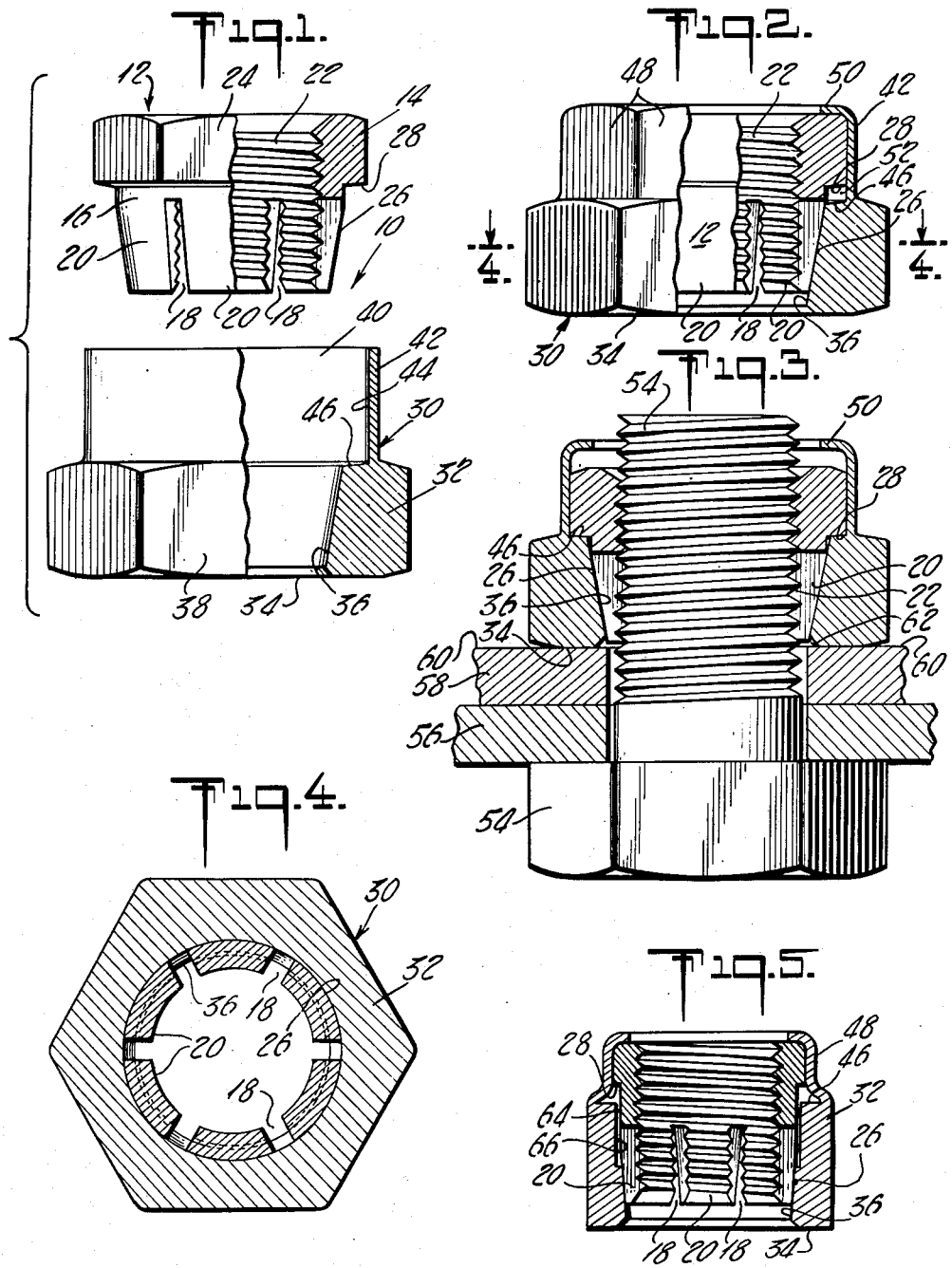
INVENTOR
Charles A. Fineran
BY
Jarvis Markle
his ATTORNEY Sept. 28, 1954
C. A. FINERAN
2,690,201
SELF-LOCKING NUT
Filed Dec. 20, 1949
2 Sheets-Sheet 2
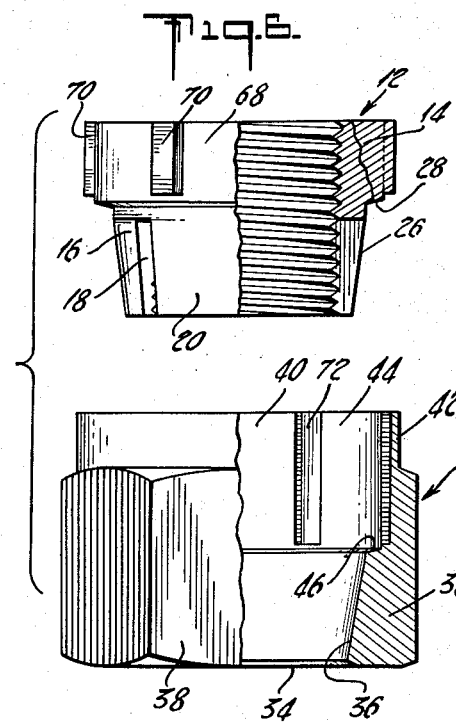
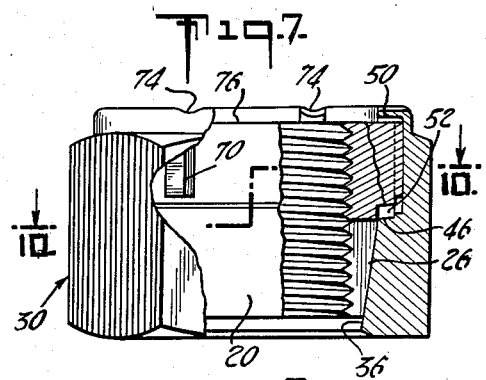
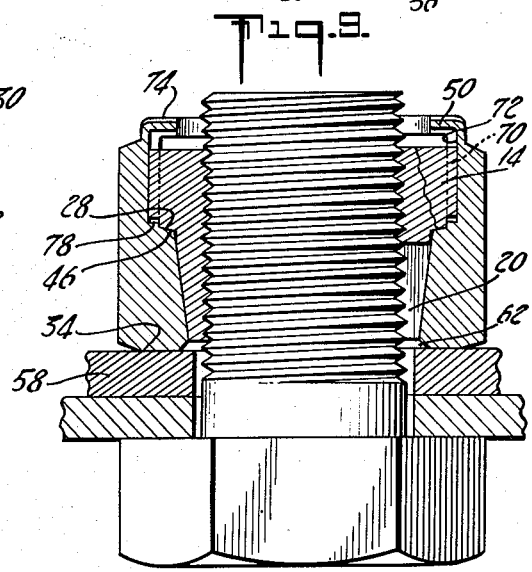
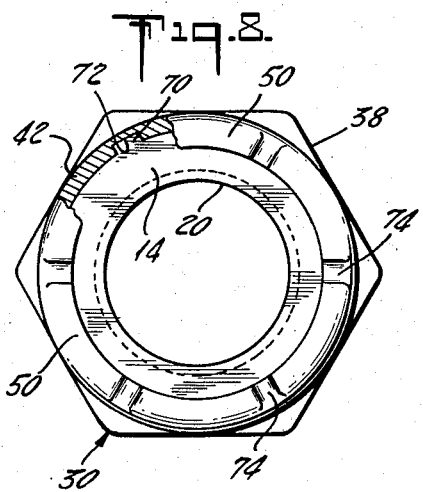
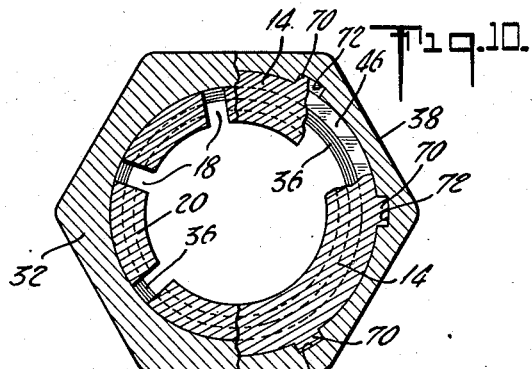
INVENTOR
Charles A. Fineran
BY
Javis C. Marble
ATTORNEY

Patented Sept. 28, 1954

2,690,201

UNITED STATES PATENT OFFICE 2,690,201

SELF-LOCKING NUT

Charles A. Fineran, East Orange, N. J., assignor to Elastic Stop Nut Corporation of America, Union, N. J., a corporation of Delaware Application December 20, 1949, Serial No. 134,040

3 Claims. (Cl. 151—19)

This application is a continuation-in-part of my copending application Serial No. 70,410, filed January 12, 1949, now abandoned.

The present invention relates to self-locking nuts and has particular reference to self-locking nuts of the kind in which the locking action is effected by radial gripping action between the threads of the nut and cooperating bolt or screw when the nut is applied and seated.

Among the general objects of the invention are to provide a new and improved form of self locking nut of all metal construction which can be utilized in high temperature applications; which will be of the "free-spinning" type, that is, of the type capable of being freely turned on a bolt thread until the nut is seated and drawn home to create the locking action; which is reusable substantially without limitation without loss or impairment of its locking action; which can be made of materials permitting use of the nut in high tensile applications and which may readily be manufactured at relatively low cost on a mass production basis.

Other and more detailed objects of the invention and the advantages to be derived from its use will appear more fully in the ensuing portion of this specification in which is described by way of example but without limitation suitable practical embodiments of the invention.

In the accompanying drawings forming a part hereof:

Fig. 1 is an exploded view partly in elevation and partly in section of the two component parts of a nut embodying the invention;

Fig. 2 is an elevation partly in section of the assembled nut before its application to another threaded part;

Fig. 3 is a section showing the nut of Fig. 2 applied in locking engagement to a bolt;

Fig. 4 is a section taken on the line 4—4 of Fig. 2;

Fig. 5 is a sectional view of an assembled nut of slightly different form, before being applied in use;

Fig. 6 is an exploded view similar to Fig. 1 of another form of nut embodying the invention;

Fig. 7 is an elevation partly in section of the assembled nut of Fig. 6 before its application to another threaded part;

Fig. 8 is a top plan view of the assembled nut;

Fig. 9 is a longitudinal section of the nut of Fig. 7 applied in locking engagement to a bolt; and Fig. 10 is a section taken on the line 10—10 of Fig. 7.

Referring now to Figs. 1 to 4 of the drawings, the nut designated generally by 10 comprises an inner or core member 12 having a head portion 14 from which depends a skirt portion 16. The skirt portion is axially slotted preferably by a plurality of slots 18, six such slots equi-distantly spaced circumferentially, being employed in the embodiment illustrated. Obviously the number of slots may be varied and in certain instances a single slot may suffice. The skirt portion of the member is thus divided by the slots into a plurality of radially yieldable fingers 20.

The member 12 is internally threaded with thread 22.

The head portion 14 of the member is peripherally continuous and its outer periphery is in the embodiment shown of hexagonal configuration providing six flats 24. Other external configuration of the head portion may be employed, the criterion being that externally the head portion be non-circular. While for structural reasons it is preferable that the head portion of the inner member be peripherally continuous, as in the example illustrated, the inner member may without impairing the locking action be slotted through its length by at least one slot.

The external surface 26 of the skirt portion 16 is tapered and preferably, as shown, is conical with decreasing diameter in the direction away from the head portion. The maximum diameter of the surface 26 is less than the maximum diameter of the head portion, which in the present instance is the diameter across the points of the hexagonal section. Preferably the maximum diameter of the conical surface is slightly less than the diameter across the flats. Regardless of the specific configuration of the head portion the maximum diameter of the skirt portion is smaller than the maximum diameter of the head portion so as to provide a shoulder or abutment 28 between the two portions of the member.

The outer or shell member 30 of the nut comprises a base portion 32 providing a base surface or face 34 for engagement with the work when the nut is drawn home in use. The base portion is provided with an internal conical surface 36 complementary to the conical surface 26 on the inner member 12 and in the embodiment shown is externally formed to provide the usual hexagon having wrench engaging flats 38.

So far as the present invention is concerned, however, the nut may have any desired form of external base configuration such as square, slotted or the like for use with any desired form of socket or spanner wrench.

The member 30 also includes a retainer portion 40 which in the embodiment illustrated is formed in the blank in the shape of a relatively thin walled cylindrical flange 42 extending upwardly from the base portion and having a bore 44 of larger diameter than the maximum diameter of the conical surface 36, in order to provide an internal shoulder 46 between the surface 36 and the bore 44.

In Fig. 2 the parts shown in Fig. 1 are illustrated in assembled condition to form the completed nut. Assembly of the nut is effected by inserting the inner member within the outer member and thereafter by any suitable closing operation of known character, usually effected by means of a punch press operation employing a suitably formed closing tool, deforming the flange 42 to provide a series of flats 48 in radial engagement with the flats 24 of the inner member and to provide an inturned rim or lip 50 overlying the top surface of the inner member. As will be apparent from the drawings such deformation of the retainer portion of the outer member secures the two members against rotation relative to each other while permitting limited axial movement of the members relative to each other.

When the parts are manufactured the relative diameter of the conical surfaces 26 and 36 are made such that when the parts are assembled in unstressed condition the skirt portion of the inner member seats in the base portion of the outer member with an axial clearance space 52 between the shoulders 28 and 46 on the respective members. Also the length of the skirt portion below the shoulder 28 on the inner member is made somewhat less than the distance between the shoulder 46 and the base surface 34 of the outer member so that when assembled in unstressed condition the axial length of the clearance space 52 is less than the distance from the base face of the outer member to the free ends of the fingers 20 on the inner member.

In order more clearly to illustrate the nature of the construction and the action of the nut in use the clearance 52 and the distance from the free ends of fingers 20 to the base plane of the nut, when the nut is unstressed, has been exaggerated in relation to the size of the nut illustrated.

When the nut is assembled in the condition shown in Fig. 2 the threaded portion is substantially unstressed radially and the nut may therefore be freely threaded or spun on a suitable companion screw or bolt thread. In Fig. 3 the nut is shown in applied position, threaded on a bolt 54 to form an assembly for holding together work pieces such as plates 56 and 58, the base face of the nut being in pressure engagement with the face 60 of the member 58.

As will be more or less evident from the drawing, when the nut is drawn home, contact is first made between the faces 34 and 60 and thereafter as the nut is turned on the bolt, or vice versa, the interengaging threads act to pull the inner member of the nut axially inwardly relative to the outer member or shell, the movement of which has been arrested. This produces relative axial movement between the complementary conical surfaces, relative rotational movement of the parts being prevented by the interengagement between the non-circular retainer portion of the outer member and the head portion of the inner member. The axial relative movement between the conical surfaces operates to elastically compress the fingers 20 of the inner member to provide the desired radial compressive or gripping action of the nut on the shank of the bolt, it being understood that the nut is made from suitable material usually metal having sufficient elasticity to permit such elastic deflection without exceeding the elastic limit of the material.

As will be observed from Fig. 3 the relative axial movement between the two portions of the nut when the nut is drawn fully home is limited by the abutment of the surfaces of shoulders 28 and 46, contact between these surfaces serving to limit the inward movement of the inner member while there is still clearance as indicated at 62, between the free ends of the fingers 20 and the plane of the base of the nut.

The provision of the shoulders 28 and 46 for limiting relative movement between the parts of the nut is a highly important requirement for a practical nut since without such positive limitation of such movement, the locking torque which might be applied by continuing the inward movement of the inner member and radial compression of the fingers 20, might readily become so great as to destroy the assembly by shearing the bolt or stripping the threads, or if that were not done to create a locking torque sufficiently great to make it practically impossible to remove the nut.

With the positive stop provided by the abutting shoulders of the parts the inward deflection of the fingers 20 can be definitely limited so that a predetermined maximum locking torque sufficient to prevent unintended loosening of the nut under vibration but still permitting desired removal of the nut by tool applied torque, can readily be obtained.

When it is desired to remove the nut and it is backed off, the elastic fingers 20, relieved of compressive pressure, tend to spring back to their normal position with an accompanying slight relative axial movement between the parts of the nut, after which the nut may readily be turned or spun off the thread with which it is in engagement.

As previously noted the clearances and other related dimensions illustrative of the relative axial movement of the nut parts have been shown for the sake of clarity on a greatly exaggerated scale, the actual relative axial movement between the parts required to secure the desired locking torque being only a matter of a few thousandths of an inch in the case of nuts having threads of the order of a quarter-inch diameter.

It is also to be noted that in addition to providing the positive axial stop formed by the shoulders 28 and 46 for limiting the radial compressive force than can be exerted, certain other requirements must be adhered to if best performance is to be secured from the nut. These requirements apply to the nature and form of the conical surfaces provided on the two members of the nut and while for purposes of description these surfaces may be considered complementary to each other as heretofore described, it is highly desirable in practice to form the two surfaces with slightly different angles of inclination with respect to the axis of the nut and with the internal conical surface of the outer member having a greater angle of inclination than that of the external surface on the inner member. In practice it has been found that a difference of the order of only approximately 2° between the angles of inclination of the respective complementary surfaces is sufficient to insure proper action of the nut. This difference between the angles of inclination of the surfaces results in radial clearance between portions of the conical surfaces dimensionally so small as to be substantially negligible and which clearance, of course, disappears when the nut is drawn home and the fingers are flexed. Consequently the difference in angle between the two complementary surfaces has not been illustrated in the drawings.

Further it has been found in practice that the minimum angle of inclination of the conical surface of the inner member is of the order of 5°, since if this angle is made substantially less than this value, the two parts of the nut are likely to freeze together when the nut is applied and drawn home to locked position, so that the nut will remain locked on the bolt even if the nut is backed off with a tool sufficiently to relieve the contact pressure between the base of the nut and the work piece. With an angle of inclination of 5° or more the two parts of the nut will slide axially relative to each other to loosen the nut on the bolt as soon as the nut is backed off to relieve the pressure between the base of the nut and the work piece. The angle of inclination of the conical surface of the inner member may be made materially greater than 5° if desired without affecting the locking action of the nut but in practice it has been found that the maximum angle of inclination that can advantageously be used in nuts conforming to standard bolt and nut specifications, so far as diameters are concerned, is of the order of 10°. If this angle is exceeded and conical surfaces of desired axial length are provided, the maximum diameter of the conical surface of the outer member becomes too large to enable the required shoulder to be formed within the outer member while still conforming to the diametral limitations of a standard nut specification for the given size.

As will be observed from the drawings illustrating the nut just described the slots 18 are extended for substantially the full length of the skirt portion of the inner member and the conical surface on the outer member extends substantially for the full depth of the base portion of the outer member so that substantially all of the skirt portion of the inner member is radially compressed when the nut is drawn home. This construction has been found in practice to be entirely practical for sizes of nut for which the invention is particularly useful and is desirable from the standpoint of simplicity and low cost of manufacture.

In the case of very large and heavy nuts, however, it may be desirable to compress the fingers of the inner member, which may be of relatively heavy section by compressive force applied primarily at the outer or free ends of the fingers, so that the latter are inwardly in the manner of the bending of cantilever beams. A form of construction of carrying this action into effect is illustrated in Fig. 5 wherein the parts are similar to those described in connection with the preceding embodiment except with respect to the formation of the interengaging surfaces which produce the locking action. In the present embodiment both the slots 18 and the conical surface terminate short of the head portion of the inner member, the slots 18, however, extending above the level of the top of surface 26 and the upper part of the skirt portion being externally defined by the cylindrical surface 64 extending between the conical surface 26 and the shoulder 28. Similarly the internal conical surface 36 of the outer member terminates within the base portion 32 of this member, the upper part of the base portion being provided with an internal cylindrical bore 66 having a working clearance with respect to the cylindrical surface 64 on the inner member and joining the conical surface 36 with the shoulder 46 between the base and retainer portions of the outer member.

As in the form previously described the relation of the diameter of the conical surfaces 26 and 36 is such that when the nut is assembled in unstressed state clearance is provided between the shoulders 28 and 46 which limit the relative axial movement between the parts, and the length of the fingers 20 is made such that when this clearance is taken up the free ends of the fingers are short of the plane of the base face 34 of the nut.

It will be evident from inspection of Fig. 5 that when the nut illustrated is drawn home, the fingers 20 are compressed by the action of the conical surfaces at the outer ends of the fingers, the latter flexing inwardly in the manner of cantilever beams. Not only is the construction shown in Fig. 5 particularly applicable for very large and heavy nuts but such construction may also advantageously be used for special types of nuts, regardless of diameter, where extremely high tensile stress applications are made, and it is desirable to have a longer than standard length of thread in relation to thread diameter. In the latter case, where the thread is longer than normal, it is not necessary to compress more than a normal portion of the length of the thread in order to secure the required locking action and with the construction illustrated the desired locking action can readily be obtained, without risk of too great locking torque, regardless of the length of the nut thread.

For certain uses, such for example as in aircraft and aircraft engine constructions, nuts and bolts, regardless of size are ordinarily made of higher grade material and subjected to much greater stresses than in ordinary practice, because of the fact that weight is such an important consideration. For such use it is also common practice to set nuts so tightly as to apply to the bolts a substantial prestress. Consequently nuts employed in such use are subjected to higher than ordinary wrenching torque and in Figs. 6 to 10 there is shown a form of nut particularly adapted to resist exceptionally high wrench torques without deformation of the nut such as to allow relative turning movement between the inner or core member and the outer or shell member.

Insofar as the slotted or skirt portion of the inner member is concerned the construction is similar to that of the form previously described in connection with Figs. 1 to 4 and corresponding portions of the structure are correspondingly numbered. As seen from Fig. 6 the skirt portion 16 of the inner member 12 is provided with circumferentially spaced slots 18 to provide readily yieldable fingers 20 the external surfaces of which are conical as shown at 26.

In the present embodiment the head portion instead of being polygonal to provide a plurality of external flats is provided with a circular external surface 68 from which a plurality of axial ribs or splines 70 (six being employed in the present instance) extend from the top face of the member to a point just short of the shoulder 28 between the skirt and head portions of the member.

The outer or shell member 30 in the present embodiment has a base portion 32 which is provided with a conical internal surface 36 and externally is of the conventional hexagonal form providing wrenching flats 38. As in the previously described embodiment the surface 36 of the shell member is substantially complementary to the conical surface 26 of the core member but has a slightly greater angle of inclination with respect to the axis of the nut as and for the purposes described in connection with the nut shown in Fig. 1. The present embodiment differs from that of Fig. 1 in that externally the base portion is of greater height, relative to the overall height of the nut, than in the previously described embodiment, the relatively thin walled cylindrical flange 42 of the retainer portion 40 being of lesser height as compared with the overall height of the nut. In the present instance the bore 44 extends downwardly well into the body portion 32 and is provided with axial slots or grooves 72 extending from the top of the member to receive the splines 70. Further as will be more clearly evident from Figs. 8 and 9, the grooves 72 are located radially in line with the points of juncture between adjacent flats 38 where the base portion of the outer member is of thickest cross section.

Thus when the nut is assembled as shown in Fig. 7, the head portion of the inner member, together with the splines 70, is located substantially within the base portion of the nut and with the splined connection between the head portion and the relatively thick wall of the base portion of the outer member which encircles the head portion, it has been found that deformation of the parts likely to permit turning of the inner member within the outer member is avoided even when the maximum desirable wrenching stresses are applied to the nut.

The parts of the nut are preferably assembled by a known punch press operation which turns the upper edge of the flange 42 inwardly as at 50 over the top of the inner member, this operation being facilitated by the presence of the grooves 72. At these grooves the wall thickness of the flange is less than elsewhere and the circumferential compression resulting from turning the flange inwardly to a small diameter is compensated by a very slight downward buckling of the thin section wall as indicated at 74. This buckling is however, so slight that, as seen more clearly in Fig. 7, the buckled portions do not extend below the lower face 76 of the inturned portion 50 of the flange which forms the upper stop for limiting upward movement of the inner member within the outer member. As will be seen from Fig. 7 the relation of the height of the head portion of the inner member between the top of the member and the shoulder 28, to the position of the shoulder 46 of the outer member relative to the conical surface 36, is such that when the nut is assembled and in unstressed condition with the inner member in its upper position a clearance space 52 is provided to enable the inner member to be drawn down against the shoulder 46 as a limit. Also as will be seen from Fig. 9 the abutment of shoulders 28 and 46 determines the lower limit position of the inner member, in which position a small clearance 78 is preferably but not necessarily maintained between the lower ends of the splines 70 and grooves 72. Also in the lower limit position the lower ends of the fingers 20 are at a level above the lower or base face 34 of the outer member so as to provide a clearance 62 between the fingers and the face of the elements such as 58 against which the nut is drawn.

Since the action of the form of nut just described is in all respects similar to that of the previously described embodiment, the description need not be repeated. It will also be understood that insofar as the external wrenching configuration of the outer member is concerned, that may be of any suitable or desired form and it will further be understood that the construction providing a radial clearance between the upper portion of the conical surface 26 and the conical surface 36, by the provision of a cylindrical bore, as shown in Fig. 5, may be incorporated in the present form of nut equally as well as in the form of nut shown in Fig. 1.

While for purposes of illustrating the invention practical examples of construction have been described by way of illustration, it will readily be apparent that many changes in the specific construction of the nut may be made without departing from the principles of the invention, the scope of which is to be considered as embracing all forms of construction falling within the purview of the appended claims.

I claim:

1. A self-locking nut comprising an inner member having a threaded bore and comprising a circumferentially continuous head portion and an axially slotted skirt portion depending from the head portion, said skirt portion having a conical external surface decreasing in diameter in the direction away from the head portion and of smaller maximum diameter than the maximum diameter of the head portion, whereby to provide a shoulder between the two portions, and an outer member encircling said inner member, said outer member comprising a circumferentially continuous base portion and a retainer portion extending from said base portion, said base portion providing a work engaging face at one end, external tool engaging surfaces and a bore providing an internal conical surface substantially complementary to the conical surface of said inner member, said retainer portion and the upper part of said base portion being internally of larger diameter than the maximum diameter of said internal conical surface to provide an internal shoulder located in the base portion of said outer member, the retainer portion of said outer member and the head portion of the inner member having axially extending interengaging internal and external surfaces, respectively, to prevent relative turning movement between said members and said retainer portion further being inturned over the end of said inner member to prevent axial disengagement of the two members, and the diameters of said conical surfaces being so related to each other and the distance between the shoulder and the free end of the skirt portion of the inner member being less than the distance between the shoulder and the work engaging face of the outer member so that when the two members are assembled with said conical surfaces in contact an axial clearance space is provided between the shoulders on the respective members and the end of the skirt portion on the inner member terminates short of the work engaging face on said outer member by a distance greater than the axial extent of said clearance space.

2. A nut as set forth in claim 1 in which the cooperating tapered surfaces are axially spaced from the head portion of the inner member.

3. A nut as set forth in claim 2 in which radial working clearance is provided between said members over the portions thereof lying between said tapered surfaces and the shoulders of the respective members.

References Cited in the file of this patent

UNITED STATES PATENTS

| Number | Name | Date |
|---|---|---|
| 526,308 | Garvin | Sept. 18, 1894 |
| 786,725 | Bryce | Apr. 4, 1905 |
| 896,358 | Bryce | Aug. 18, 1908 |
| 1,324,012 | Johnson | Dec. 2, 1919 |
| 1,470,528 | Flentjen | Oct 9, 1923 |
| 2,266,961 | Desbrueres | Dec. 23, 1941 |
| 2,321,466 | Crowther | June 8, 1943 |
| 2,361,979 | Tarwater | Nov. 7, 1944 |
| 2,564,511 | Smith | Aug. 14, 1951 |

FOREIGN PATENTS

| Number | Country | Date |
|---|---|---|
| 52,769 | Switzerland | May 1, 1911 |
| 77,681 | Switzerland | Oct. 1, 1918 |
| 207,907 | Great Britain | Dec. 13, 1923 |
| 563,825 | Great Britain | Aug. 31, 1944 |